(12) United States Patent
Labute et al.

(10) Patent No.: US 7,802,033 B2
(45) Date of Patent: Sep. 21, 2010

(54) ADAPTIVE BANDWIDTH DISTRIBUTION SYSTEM FOR HIGH-PERFORMANCE INPUT/OUTPUT DEVICES WITH VARIABLE THROUGHPUT

(75) Inventors: Daniel Labute, Mont-Royal (CA); Eric Vinet, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 151 days.

(21) Appl. No.: 12/179,529

(22) Filed: Jul. 24, 2008

(65) Prior Publication Data

US 2009/0271537 A1 Oct. 29, 2009

Related U.S. Application Data

(60) Provisional application No. 61/047,395, filed on Apr. 23, 2008.

(51) Int. Cl.
*G06F 3/00* (2006.01)
*G06F 9/00* (2006.01)

(52) U.S. Cl. .............................. 710/54; 710/310; 710/5; 710/33; 718/105

(58) Field of Classification Search .................. 710/5–7, 710/15–19, 33–35, 52–56, 310; 718/102–105
See application file for complete search history.

(56) References Cited

U.S. PATENT DOCUMENTS

| | | | |
|---|---|---|---|
| 5,905,889 A * | 5/1999 | Wilhelm, Jr. ................. | 718/104 |
| 6,466,939 B1 | 10/2002 | Lai et al. | |
| 6,631,435 B1 | 10/2003 | Lym et al. | |
| 7,197,564 B1 * | 3/2007 | Bhoj et al. ................... | 709/225 |
| 7,207,043 B2 * | 4/2007 | Blythe et al. ................ | 718/104 |
| 2002/0147853 A1 * | 10/2002 | Sherman et al. ............. | 709/310 |
| 2003/0172147 A1 | 9/2003 | Chang et al. | |
| 2003/0182464 A1 * | 9/2003 | Hamilton et al. ............ | 709/314 |
| 2005/0183084 A1 * | 8/2005 | Cuomo et al. ............... | 718/100 |
| 2006/0112301 A1 * | 5/2006 | Wong ............................ | 714/6 |
| 2006/0277330 A1 * | 12/2006 | Diepstraten et al. .......... | 710/40 |
| 2009/0254685 A1 * | 10/2009 | Diepstraten et al. ......... | 710/106 |

OTHER PUBLICATIONS

Office Action, U.S. Appl. No. 12/179,537 dtd. Mar. 25, 2010.

* cited by examiner

*Primary Examiner*—Christopher B Shin
(74) *Attorney, Agent, or Firm*—Patterson & Sheridan, LLP (57) ABSTRACT

A method for issuing shadow requests to manage bandwidth allocation between an application that issues input/output (I/O) operation requests and an I/O device. A bandwidth manager detects the completion of an I/O operation, which includes either a read operation or a write operation. The bandwidth manager calculates a statistical duration for future I/O operations between the application and the I/O device based on throughput statistics related to past I/O operations. The bandwidth manager generates a shadow request for reserving a position in a queue that stores pending I/O requests for the I/O device for a first future I/O operation request from the application and having a duration related to the statistical duration, and inserts the shadow request into the queue. Advantageously, applications that do not make frequent I/O operation requests in advance may still execute I/O operations because bandwidth is reserved for future I/O operation requests via the shadow requests.

19 Claims, 8 Drawing Sheets

ADAPTIVE BANDWIDTH DISTRIBUTION SYSTEM FOR HIGH-PERFORMANCE INPUT/OUTPUT DEVICES WITH VARIABLE THROUGHPUT

CROSS-REFERENCE TO RELATED APPLICATIONS

This application claims the priority benefit of provisional U.S. Patent Application Ser. No. 61/047,395, filed Apr. 23, 2008, the subject matter of which is hereby incorporated by reference.

BACKGROUND OF THE INVENTION

1. Field of the Invention

The present invention generally relates to the field of data access. More specifically, the invention relates to an adaptive bandwidth management system for high-performance input/output devices with variable throughput.

2. Description of the Related Art

In a computer system, an input/output (I/O) device is generally a hardware device with which the computer system may perform I/O operations. Common I/O devices include memory systems, hard drives, CD-ROM drives, and printers, among others. Such an I/O device is typically managed via a device driver, which is a software program written specifically to allow one or more applications running on the computer system to communicate with the I/O device. An application may make a request to use the I/O device via a call to the driver associated with the I/O device.

The number of I/O operations an I/O device can execute in a given time period is limited by the bandwidth of that I/O device. Since applications normally request bandwidth faster than the bandwidth can be made available, the driver maintains a queue of pending I/O requests received from the various applications running on the system. Typically, I/O requests are handled by a driver in the order in which they are received. When a queued I/O request is executed, the driver allows the application that made the I/O request to use the I/O device for a period of time. After the requested I/O operation is executed, the driver advances to the next queue position.

Some computer systems may manage I/O device bandwidth at the device driver level according to a set of rules followed by the operating system or implemented via a proprietary application programming interface (API) embedded within each application. Request scheduling for a particular I/O device is based on the bandwidth required by each application and the I/O requests currently in the queue of the driver associated with the I/O device. The maximum bandwidth required by an application may define a priority ranking of the application relative to the other applications that access the I/O device. When the queue is not empty, high priority applications are allowed to use the I/O device, regardless of queue position.

One drawback of this approach is that the bandwidth management system is prevented from making optimal scheduling decisions. For example, in a scenario where a low priority application queues I/O requests far in advance, and then a high priority application queues an I/O request only when the I/O operation is required, the I/O request of the high priority application may be delayed because the queue is clogged with low priority I/O requests. Another drawback is that when a high-bandwidth application requests more bandwidth than what is actually required to execute the relevant I/O operation, I/O device bandwidth is wasted. For example, if a high-bandwidth application uses less time to complete an I/O operation with respect to a particular I/O device than the time requested, then that I/O device remains reserved for the high-bandwidth application throughout the requested time period, even though the I/O device is not in use. Yet another drawback is that the actual bandwidth that an I/O device can handle may vary over time according to fragmentation, hardware degradation, or partial failure, among other things, thus further complicating efficient scheduling using prior art techniques.

As the foregoing illustrates, there is a need in the art for a more effective bandwidth management system.

SUMMARY OF THE INVENTION

Embodiments of the invention provide a method for issuing shadow requests to manage bandwidth allocation between an application that issues input/output (I/O) operation requests and an I/O device. A bandwidth manager detects the completion of an I/O operation, which includes either a read operation or a write operation. The bandwidth manager calculates a statistical duration for future I/O operations between the application and the I/O device based on throughput statistics related to past I/O operations. The bandwidth manager generates a shadow request for reserving a position in a queue that stores pending I/O requests for the I/O device for a first future I/O operation request from the application and having a duration related to the statistical duration, and inserts the shadow request into the queue.

Advantageously, applications that do not make frequent I/O operation requests in advance may still execute I/O operations because bandwidth is reserved for future I/O operation requests via the shadow requests.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
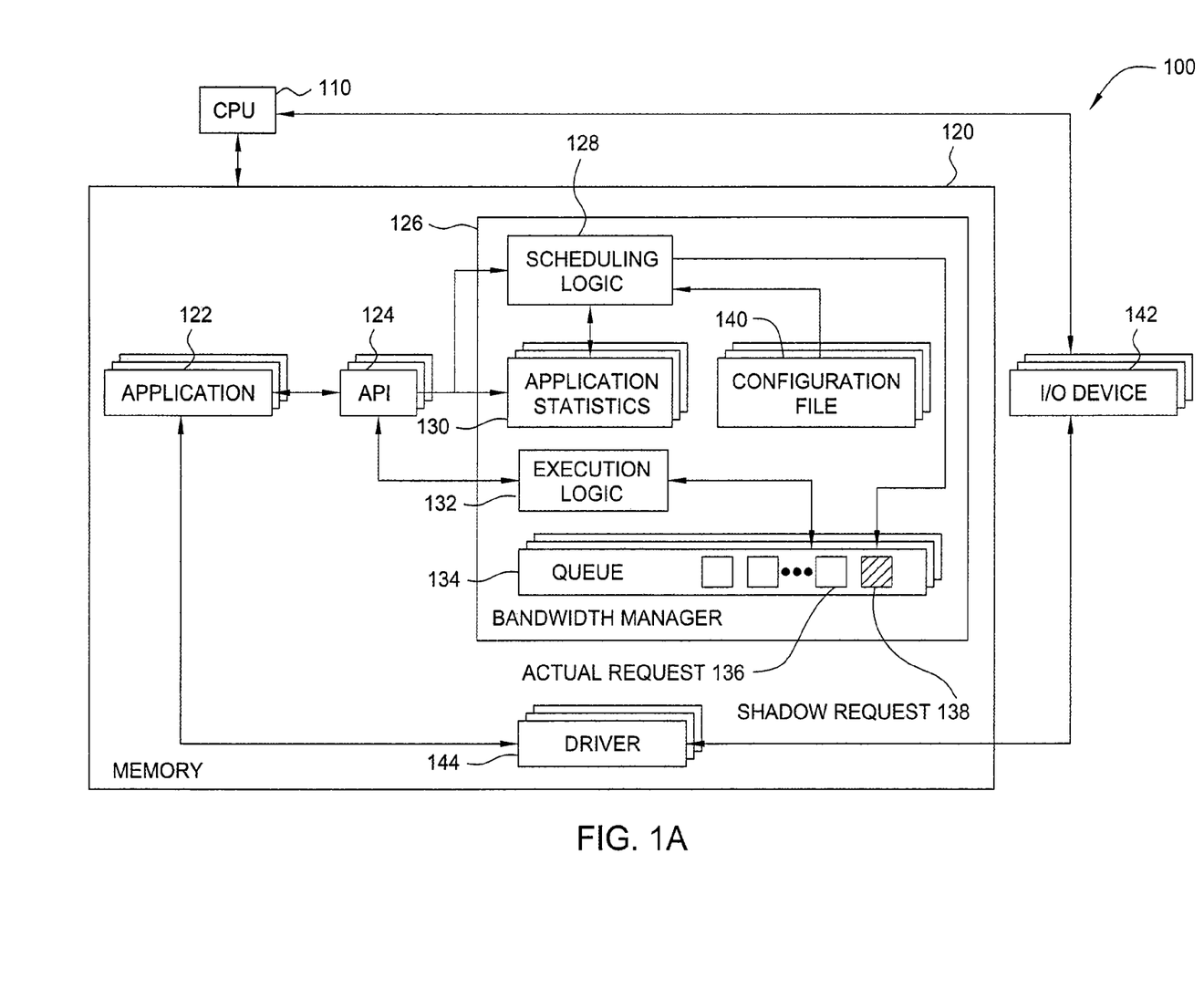
FIG. 1A is a computer system configured to implement one or more aspects of the present invention.

FIG. 1A is a computer system configured to implement one or more aspects of the present invention. FIG. 1A includes a CPU 110, a memory 120, and one or more I/O devices 142. The I/O devices 142 are generally peripheral devices connected to the computer system that may include hard disks, memory, computer monitors, CD-ROM drives, or other devices. The CPU 110 is connected to both the memory 120 and the I/O devices 142 and typically executes programming instructions stored on the memory 120 that may cause the connected I/O devices 142 to receive or transmit data.

The memory 120 includes one or more applications 122, one or more APIs 124 corresponding to each of the applications 122, a bandwidth manager 126, and a driver 144 corresponding to each of the I/O devices 142. The applications 122 may perform I/O operations with one of the I/O devices 142 by making an I/O operation request to the bandwidth manager 126 via the API 124. In one embodiment, the I/O operation request may include the requested I/O device, the size of the operation, and the type of operation. The bandwidth manager 126 includes a scheduling logic 128 that schedules I/O requests for each of the applications 122 with the requested device 142 for the proper amount of time.

The bandwidth manager 126 includes scheduling logic 128, one or more sets of application statistics 130, execution logic 132, one or more queues 134 corresponding to each of the I/O devices 142, and one or more configuration files 140 corresponding to each I/O device 142. The scheduling logic 128 schedules I/O requests for the applications 122 with the different I/O devices 142 by inserting either actual requests 136 or shadow requests 138 into the queue 134 associated with the requested I/O device 142. Actual requests 136 are generated by the scheduling logic 128 in response to I/O operation requests made by the application 122. Shadow requests 138 are generated in response to completed execution of I/O operations by the application 122. As described in greater detail herein, shadow requests 138 are scheduled to anticipate future I/O operation requests made by the application 122.

The scheduling logic 128 generates the actual requests 136 and the shadow requests 138 for each of the applications 122 on each of the I/O devices 142 based on statistical data stored in the one or more application statistics 130 and the one or more configuration files 140. In one embodiment, the statistical data includes an average duration of I/O operations, a size of those I/O operations, and a frequency of those I/O operations being executed by each application 122 with each of the I/O devices 142, as further described in FIGS. 1B and 1D. The execution logic 132 executes both actual requests 136 and shadow requests 138, as further described in FIGS. 1C and 1E.

Figure 1B:
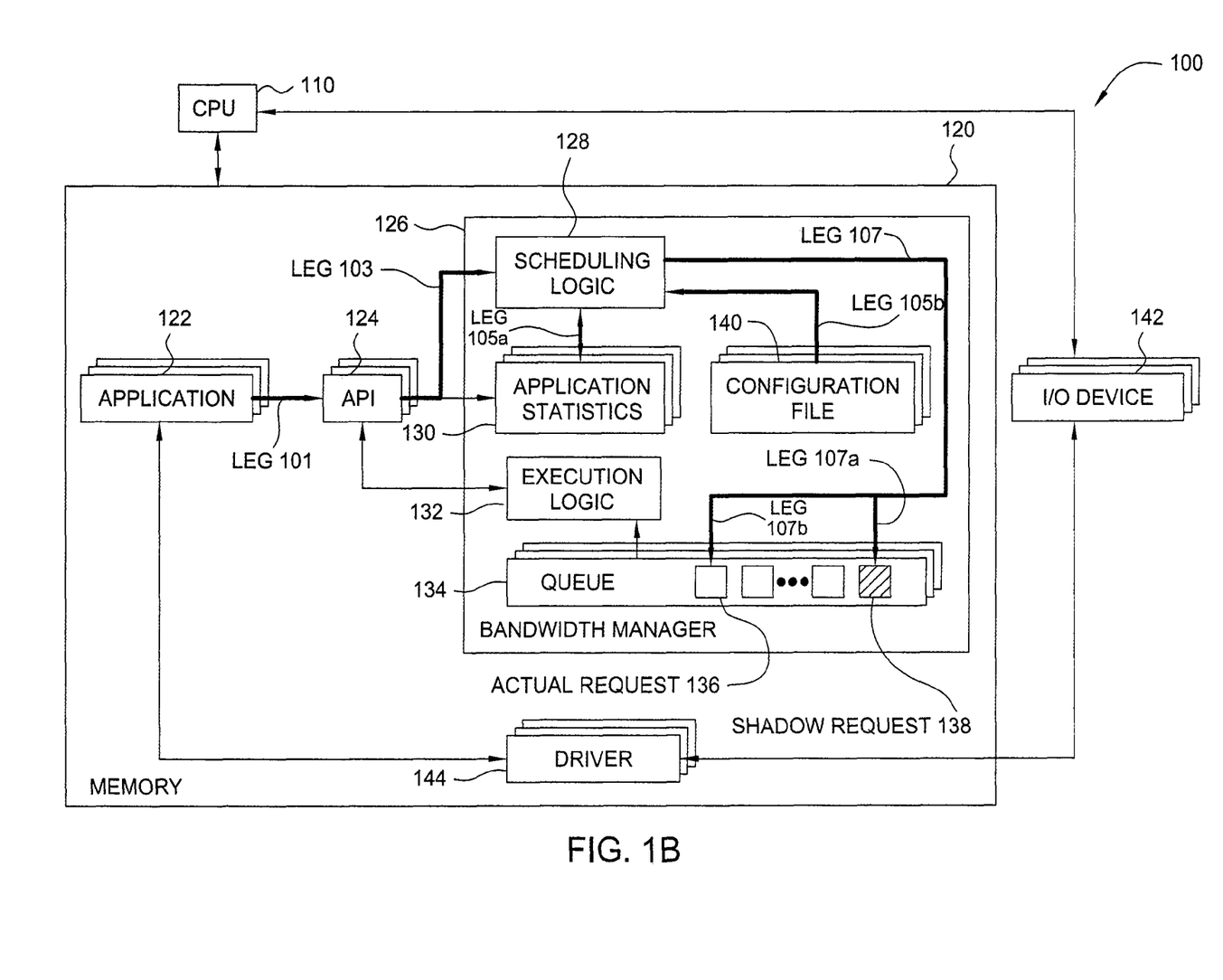
FIG. 1B is a computer system configured to schedule an I/O request, according to one embodiment of the invention.

FIG. 1B is a computer system configured to schedule an I/O request, according to one embodiment of the invention. As shown, FIG. 1B includes the same components as shown in FIG. 1A. Additionally, sequential processing legs 101-107 are demarcated to indicate the flow of data when an application 122 makes an I/O operation request and either an actual request 136 or a shadow request 138 is scheduled.

The application 122 transmits the I/O operation request along leg 101 to the corresponding API 124, which acts as an interface between the bandwidth manager 126 and the application 122. The API 124 transmits the I/O operation request to the scheduling logic 128 along leg 103. The scheduling logic 128 then retrieves statistical data from the application statistics 130 along leg 105a and determines the actual throughput of the requested I/O device 142 during previous I/O operations executed for the requesting application 122. The scheduling logic 128 then determines the duration of time needed for the requested I/O device 142 to execute the requested I/O operation based on the size of the requested I/O operation and the actual throughput of the I/O device 142. If the I/O device 142 has not executed an I/O operation for the application 122 yet, then a nominal value for the throughput of the I/O device is used for the throughput determination. This nominal throughput data is stored in the configuration file 140 for each I/O device 142 and retrieved by the scheduling logic 128 along leg 105b when scheduling the initial I/O request. In alternative embodiments, the I/O device transmits the nominal throughput data directly to the application statistics 130, without the use of the configuration file 140.

Once the scheduling logic 128 determines the duration of time for the I/O operation, the scheduling logic 128 generates an actual request 136 associated with the duration, and schedules the actual request 136 for the application 122 by inserting the actual request 136 into the queue 134 associated with the requested I/O device 142. If any unexecuted shadow requests 138 for the application 122 are located in the queue 134, then the scheduling logic 128 replaces the shadow request 138 closest to the front of the queue 134 with the actual request 136 along leg 107a. If no unexecuted shadow requests 138 for the application 122 are located in the queue 134, then the actual request 136 is inserted at the end of the queue 134 along leg 107b.

Figure 1C:
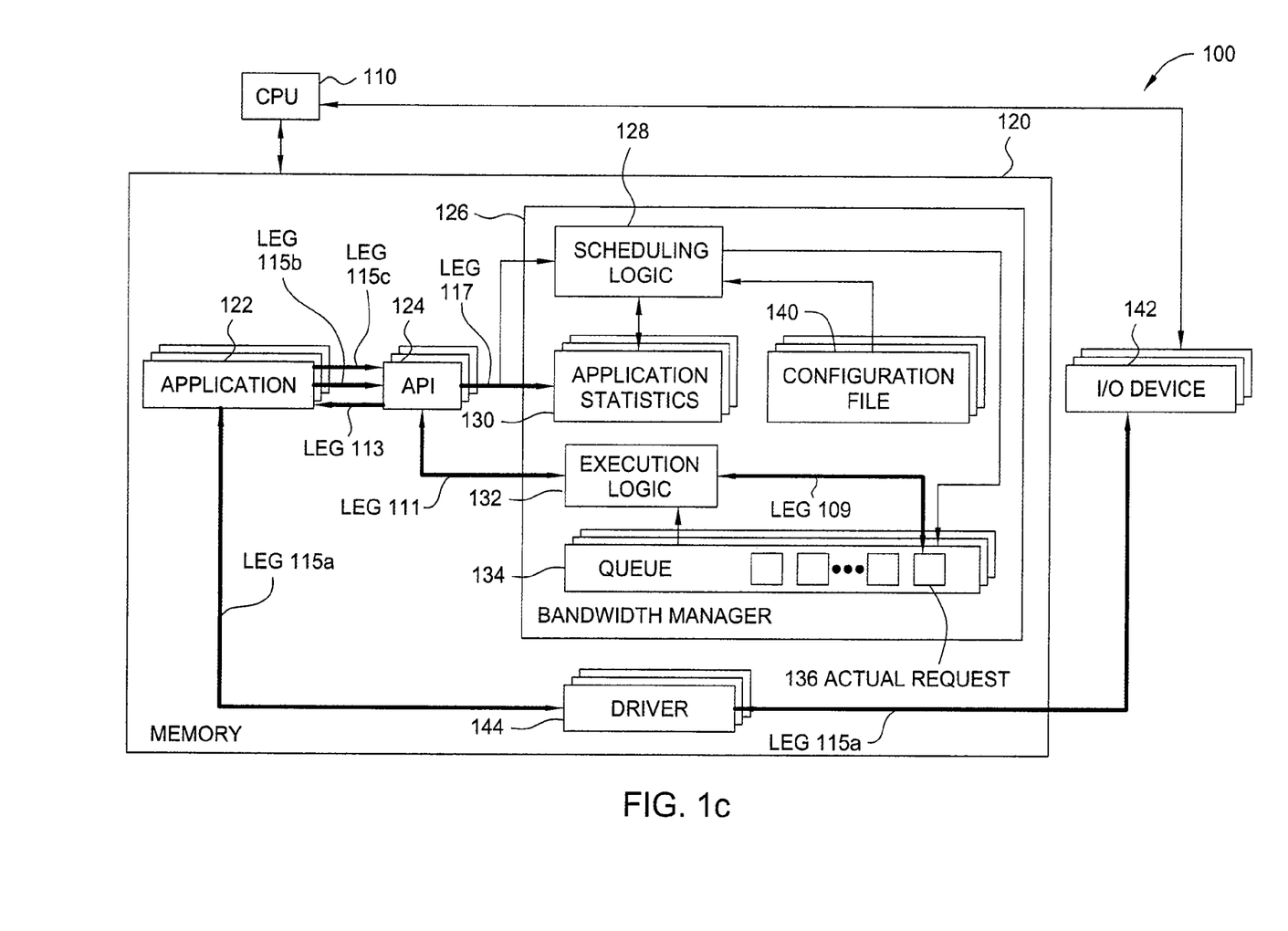
FIG. 1C is a computer system configured to execute an I/O operation, according to one embodiment of the invention.

FIG. 1C is a computer system configured to execute an I/O operation, according to one embodiment of the invention. As shown, FIG. 1C includes the same components as shown in FIG. 1A. Additionally, sequential processing legs 109-117 are demarcated to indicate the flow of data when an actual request 136 is executed as an I/O operation.

The execution logic 132 is configured to detect actual requests 136 at the front of the queues 134 along leg 109. When an actual request 136 is detected, the execution logic 132 instructs the API 124 associated with the application 122 for which the actual request 136 was made, along leg 111, to unblock the application 122. The application 122 initiates the I/O operation with the requested I/O device 142 via the driver 144, along leg 115a. The application 122 declares the start of the I/O operation to the API 124 along leg 115b. Once execution of the I/O operation is complete, the application 122 declares the end of the I/O operation to the API 124 along leg 115c. The API 124 records, in the application statistics 130, the actual time the I/O device 142 took to complete the I/O operation based on the start and end times received from the API 124. The API 124 also records the size of the I/O operation in the application statistics 130. The recordations to the application statistics 130 are performed along leg 117. In one embodiment, the scheduling logic 128 may use the statistical data stored in the application statistics 130 to schedule I/O requests 138 for the application 122, as discussed in FIGS. 1B and 1D.

Figure 1D:
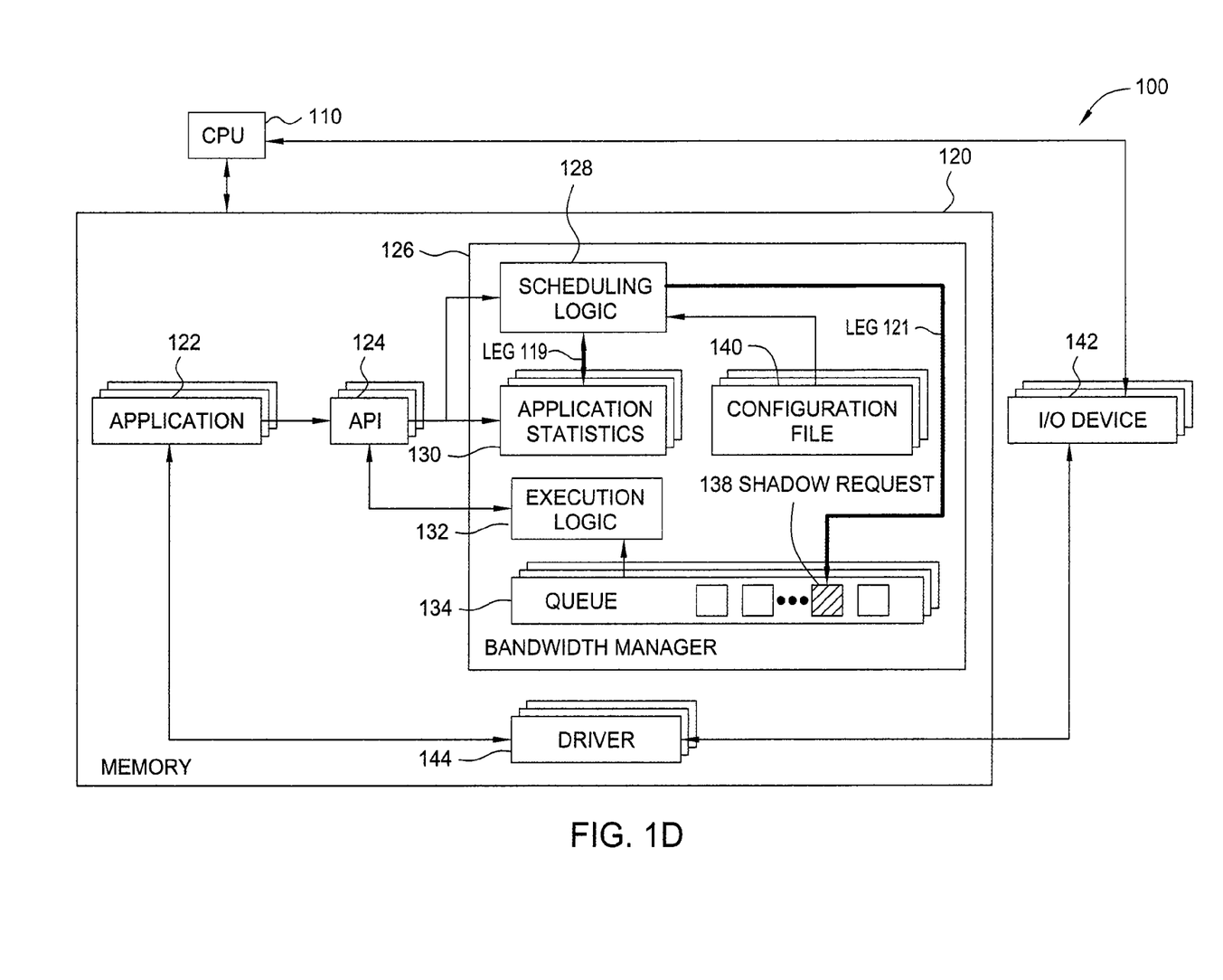
FIG. 1D is a computer system configured to schedule a shadow request, according to one embodiment of the invention.

FIG. 1D is a computer system configured to schedule a shadow request 138, according to one embodiment of the invention. As shown, FIG. 1D includes the same components as shown in FIG. 1A. Additionally, sequential processing legs 119,121 are demarcated to indicate the flow of data when a shadow request 138 is scheduled.

The scheduling logic 128 is configured to schedule shadow requests 138 for one of the applications 122 in response to completed execution of I/O operations by the application 122 with an I/O device 142. When the application 122 completes execution of an I/O operation, the scheduling logic 128 retrieves the previously recorded I/O operation statistics associated with that application 122 along leg 119, including the size and duration of previous I/O operations. The scheduling logic 128 then calculates the throughput of the I/O device 142 when the I/O device 142 executes I/O operations for the application 122. In one embodiment, the calculation is based on average values of the application statistics 130. The scheduling logic 128 also retrieves I/O operation frequency data associated with the application 122 and the I/O device 142. In one embodiment, the frequency data is determined based on the average difference between timestamps recorded by the API 124 when the application 122 makes I/O operation requests. In another embodiment, timestamps are recorded when the application 122 completes execution I/O operations and the frequency data is determined relative to completed executions of I/O operations. The scheduling logic 128 inserts one or more shadow requests 138 into the queue 134 associated with the I/O device 142 along leg 121 so that the measured frequency of the I/O operations performed by the application 122 with the I/O device 142 is preserved.

In one embodiment, the shadow requests 138 are inserted between I/O requests in the queue 134 so that the inserted shadow requests 138 will be separated from both each other and from the front of the queue 134 by approximately the average interval. For example, if an application 122 performs I/O operations with one of the I/O devices 142 every 100 ms, then a shadow request 138 may be inserted approximately 100 ms from the front of the queue 134 associated with that I/O device 142. Additional shadow requests 138 would be separated from each other by 100 ms intervals. In alternate intervals, when shadow requests 138 are inserted into the queue 134, I/O requests already in the queue 134 are pushed back.

Figure 1E:
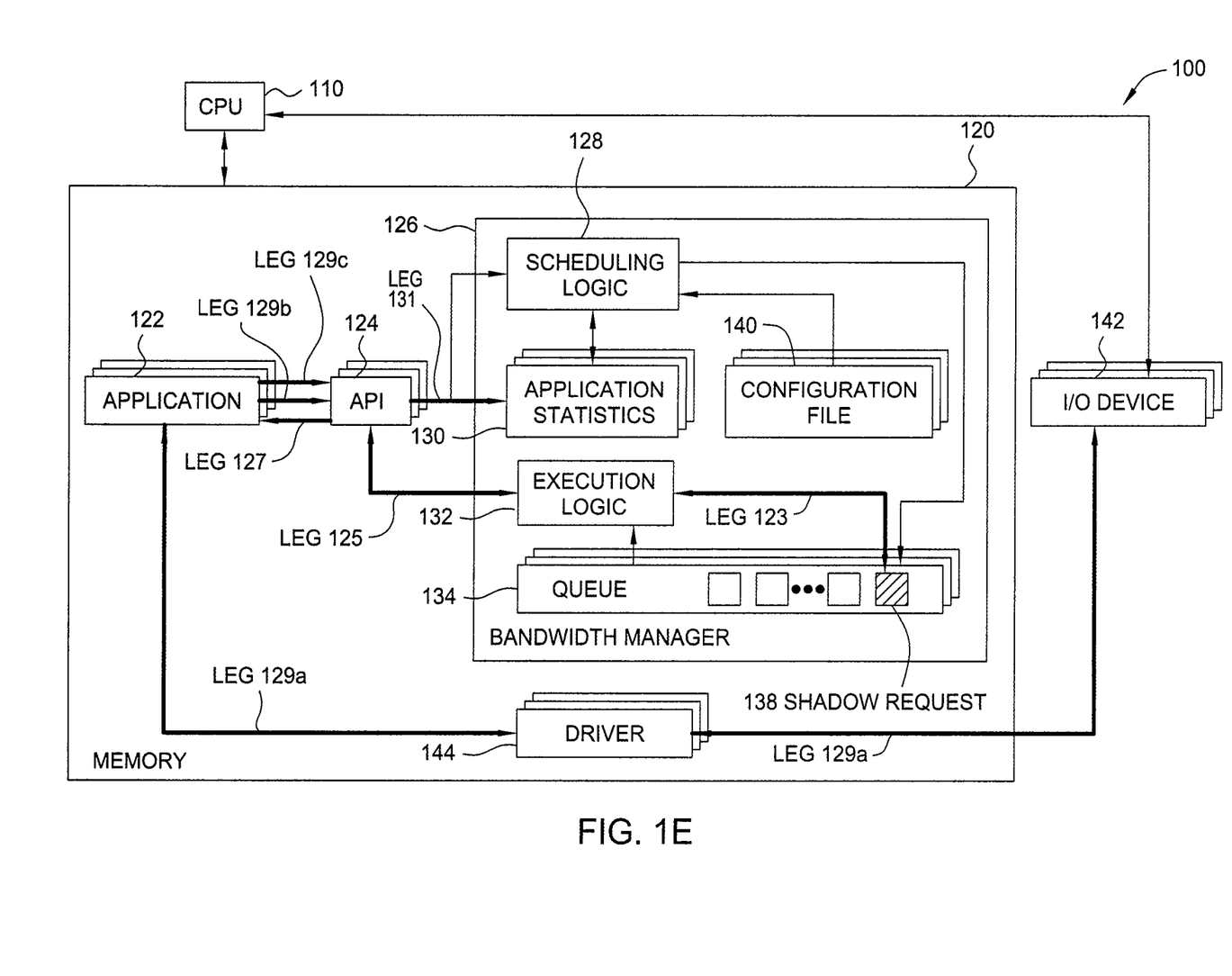
FIG. 1E is a computer system configured to execute a shadow request, according to one embodiment of the invention.

FIG. 1E is a computer system configured to execute a shadow request, according to one embodiment of the invention. As shown, FIG. 1E includes the same components as shown in FIG. 1A. Additionally, sequential processing legs 123-131 are demarcated to indicate the flow of data when the execution logic 132 executes a shadow request 138.

The execution logic 132 is configured to detect shadow requests 138 at the front of the queue 134 along leg 123. When a shadow request 138 is detected in the queue 134 associated with one of the I/O devices 142, the execution logic 132 polls the API 124 associated with the application 122 for which the shadow request 138 was made for I/O operation requests. If the application 122 does not issue an I/O operation request with the I/O device 142 during the time that the execution logic 132 polls the API 124, then the execution logic 132 advances to the next queued I/O request. If the application 122 issues an I/O operation request with the I/O device 142 during the time that the execution logic 132 polls the API 124, then the API 124 unblocks the application 122 along leg 125. The application 122 initiates the requested I/O operation via the driver 144 along leg 129a. The application 122 declares the start of execution of the I/O operation to the API 124 along leg 129b. Once the I/O operation is complete, the application 122 declares the end of execution of the I/O operation to the API 124 along leg 129c.

The API 124 records, in the application statistics 130, the actual time the I/O device 142 took to execute the I/O operation based on the start and end times received from the API 124. The API 124 also records the size of the I/O operation in the application statistics 130. The recordations to the application statistics 130 are performed along leg 131. In one embodiment, the scheduling logic 128 may use the statistical data stored in the application statistics 130 to schedule I/O requests for the application 122, as previously discussed in FIGS. 1B and 1D.

Figure 2:
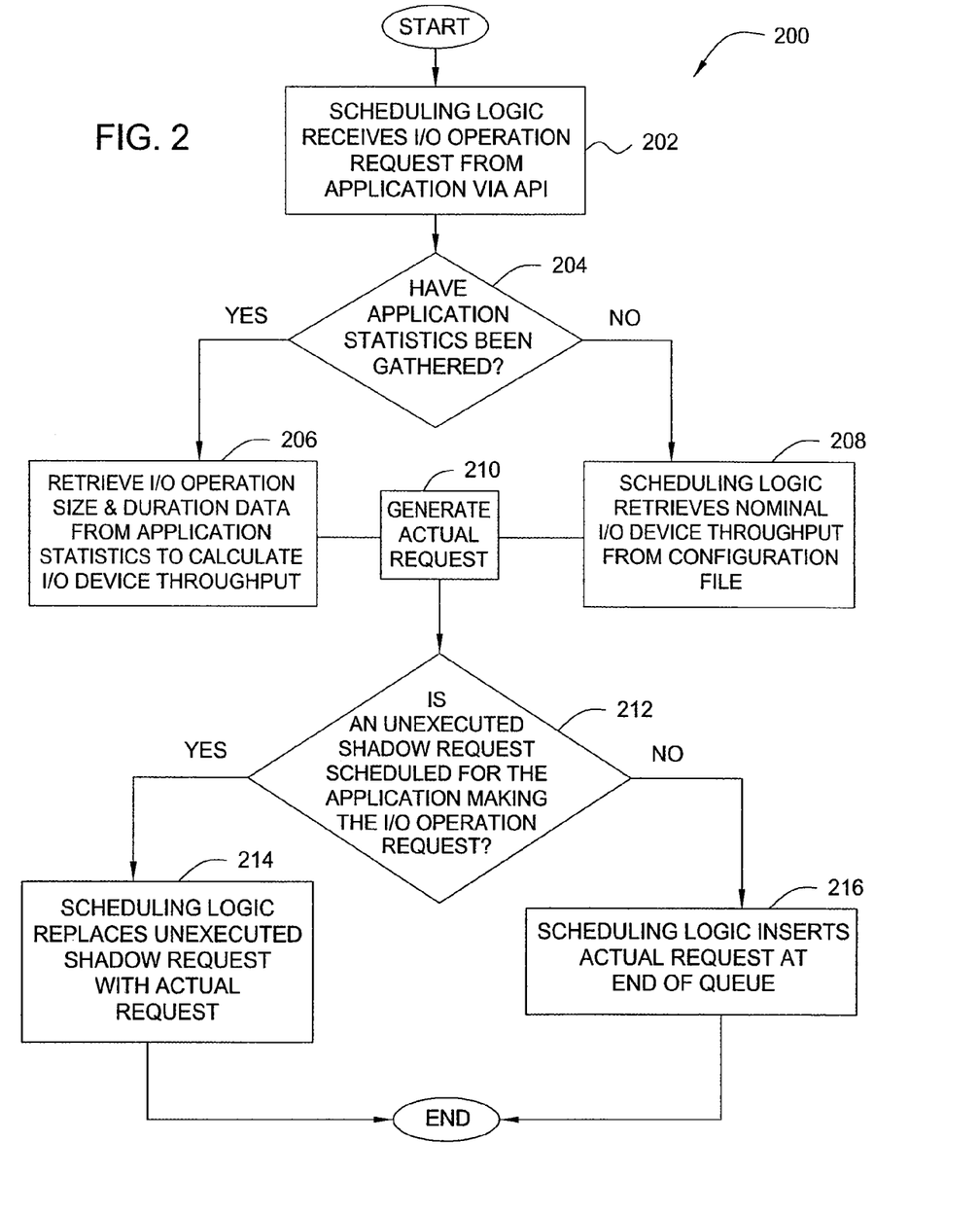
FIG. 2 is a flowchart of method steps for scheduling actual requests, according to one embodiment of the invention.

FIG. 2 is a flowchart of method steps for scheduling actual requests, according to one embodiment of the invention. Persons skilled in the art will understand that, even though the method 200 is described in conjunction with the system of FIGS. 1A-1E, any system configured to perform the method steps, in any order, is within the scope of the present invention.

The method 200 begins at step 202, where the scheduling logic 128 receives an I/O operation request from the application 122 via the API 124. At step 204, the scheduling logic 132 determines whether application statistics 130 have been gathered for I/O operations executed between the requested I/O device 142 and the requesting application 122. If the scheduling logic 128 determines that the application statistics 130 have been gathered, then the method 200 advances to step 206 where the scheduling logic 132 retrieves the size and duration of previous I/O operations executed with the requested I/O device 142 by the requesting application 122 to calculate the throughput of the requested I/O device 142 when executing I/O operations with the requesting application 122. If, at step 204, the scheduling logic 128 determines that the application statistics 130 have not been gathered, then the method 200 advances to step 208 where the scheduling logic 132 retrieves the nominal I/O device throughput data from the configuration file 140. The method 200 then advances to step 210.

At step 210, the scheduling logic 132 generates an actual request 138. In one embodiment, the scheduling logic 132 may determine the throughput of the requested I/O device 142 based on either the application statistics 130 or the configuration file 140, as previously described at steps 206, 208. The scheduling logic 132 may also calculate the amount of time required by the I/O device 142 to execute the requested I/O operation. Based on the throughput of the requested I/O device 142 and the amount of time required by the I/O device 142 to execute the I/O operation, the scheduling logic 128 generates an actual request 136.

At step 212, the scheduling logic 132 checks the queue 134 for unexecuted shadow requests 138 scheduled for the application 122. If the scheduling logic 128 does not find any unexecuted shadow requests 138 in the queue 134, then the method 200 advances to step 214 where the scheduling logic 132 replaces the unexecuted shadow request 138 closest to the front of the queue 134 with the actual request 136, and the method 200 terminates. If, at step 212, the scheduling logic 128 does not find any unexecuted shadow requests 138 for the application 122 in the queue 134, then the method 200 advances to step 216 where the scheduling logic 132 inserts the actual request 136 at the end of the queue 134, and the method 200 terminates.

Figure 3:
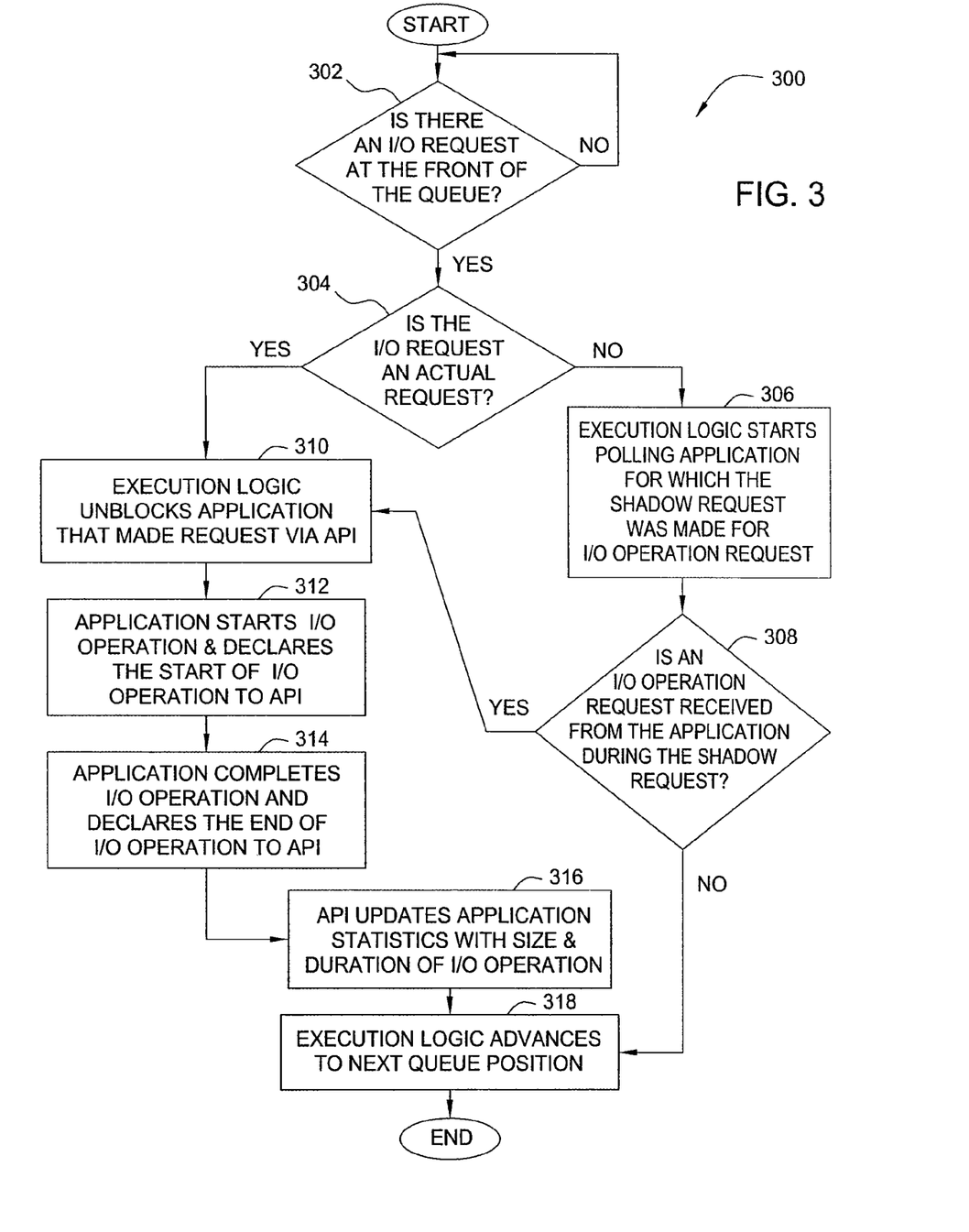
FIG. 3 is a flowchart of method steps for executing I/O operations, according to one embodiment of the invention.

FIG. 3 is a flowchart of method steps for executing I/O operations, according to one embodiment of the invention. Persons skilled in the art will understand that, even though the method 200 is described in conjunction with the system of FIGS. 1A-1E, any system configured to perform the method steps, in any order, is within the scope of the present invention.

The method 300 begins at step 302, where the execution logic 132 determines whether an I/O request (either an actual request 136 or a shadow request 138) is at the front of the queue 134. Step 302 repeats until an I/O request is found at the front of the queue 134. When an I/O request is found at the front of the queue 134, then the method 300 advances to step 304. At step 304, the execution logic 132 then determines whether the I/O request is an actual request 136 or a shadow request 138.

If the execution logic 132 determines that the I/O request is an actual request 136, then the method 300 advances to step 310. At step 310, the API 124 unblocks the application 122. At step 312, the application 122 starts execution of the I/O operation and declares the start of execution of the I/O operation to the API 124. At step 314, the application 122 completes execution of the I/O operation and declares the end of execution of the I/O operation to the API 124. At step 316, the API 124 updates the application statistics 130 with the size and duration of execution of the I/O operation. At step 318, the execution logic 132 advances to the next position in the queue 134 and the method 300 terminates.

If, at step 304, the execution logic 132 determines that the I/O request is a shadow request 138, then the method 300 advances to step 306, where the execution logic 132 begins to poll the application 122 for an I/O operation request. At step 308, if an I/O operation request is not received from the application 122 during the polling time, then the method 300 advances to step 318 where the execution logic 132 advances to the next position in the queue 134 and the method 300 terminates. If, at step 308, an I/O operation request is received by the API 124 from the application 122 during the polling time, then the method 300 advances to step 310 and executes steps 310-318, as previously described herein.

Figure 4:
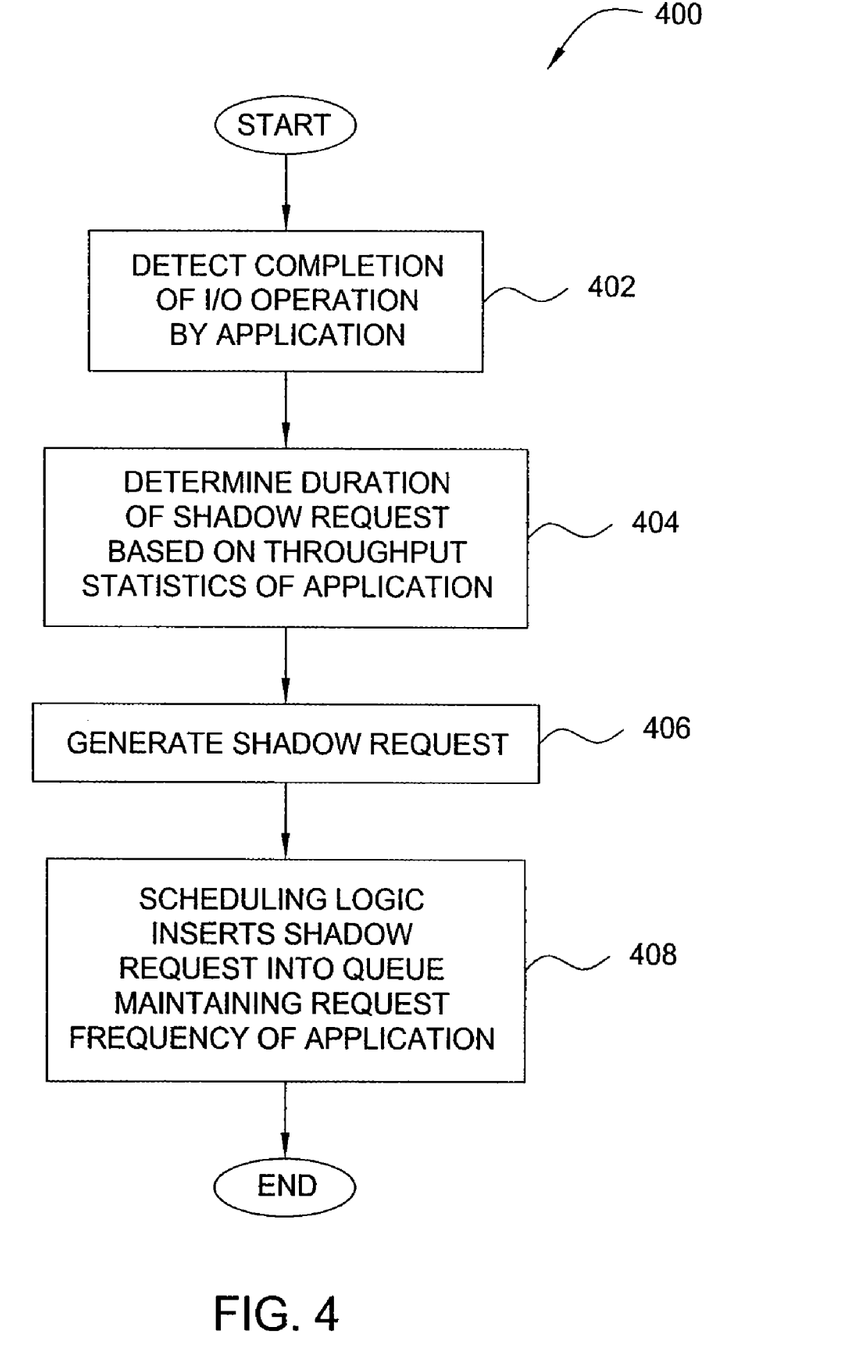
FIG. 4 is a flowchart of method steps for scheduling shadow requests, according to one embodiment of the invention.

FIG. 4 is a flowchart of method steps for scheduling shadow requests 138, according to one embodiment of the invention. Persons skilled in the art will understand that, even though the method 400 is described in conjunction with the system of FIGS. 1A-1E, any system configured to perform the method steps, in any order, is within the scope of the present invention.

The method 400 begins at step 402, where the scheduling logic 128 detects the completion of execution of an I/O operation by the application 122 with one of the I/O devices 142. At step 404, the scheduling logic 128 calculates the duration of a shadow request 138 to be generated based on the calculated throughput of that I/O device 142, as previously described. At step 406, the scheduling logic 128 generates a shadow request 138 based on the calculated throughput. At step 408, the scheduling logic 128 inserts the shadow request 138 into the queue 134 preserving the I/O operation request frequency of the application 122, as previously described.

In sum, the bandwidth of an I/O device is efficiently managed by recording statistical usage patterns of applications that utilize the bandwidth of the I/O device. The bandwidth manager is capable of predicting future I/O bandwidth requirements of those applications, such that I/O request "placeholders", e.g. shadow requests, are scheduled for each application in advance of real I/O operation requests. A scheduling logic component of the bandwidth manager schedules actual requests and shadow requests for each application. When an application makes a request to read or write a certain amount of data, the scheduling logic calculates the length of time required to complete the requested operation with the requested I/O device based on throughput data for the I/O device. An actual request is generated based on this information and inserted into the queue. If an unexecuted shadow request for the application is found in the queue, then that shadow request may be replaced with the actual request. Otherwise, the actual request is inserted at the end of the queue. When the I/O operation has completed executing at some time in the future, one or more shadow requests are generated and inserted into the queue so that the duration and frequency of those shadow requests are consistent with previous I/O operations performed by the application with the I/O device.

An advantage of the disclosed technique is that applications that do not make I/O operation requests in advance may still execute I/O operations based on the predicted requirements specific to each application. In this way, applications that make I/O operation requests in advance are prevented from displacing other applications in the queue. Yet another advantage is that the actual bandwidth an I/O device can provide is continuously monitored so that hardware deficiencies in the I/O device, which may reduce the available bandwidth of that I/O device, can be accounted for because the actual amount of time required for a particular application to execute an I/O operation with an I/O device can be predicted.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed:

1. A method for issuing shadow requests to manage bandwidth allocation between an application that issues input/output (I/O) operation requests and an I/O device, the method comprising:

detecting the completion of an I/O operation that includes either a read operation from the I/O device to the application or a write operation from the application to the I/O device;

calculating a statistical duration for future I/O operations between the application and the I/O device based on throughput statistics related to past I/O operations between the application and the I/O device;

generating a first shadow request for reserving a first position in a queue that stores pending I/O requests for the I/O device for a first future I/O operation request from the application and having a duration related to the statistical duration; and inserting the first shadow request into the queue.

2. The method of claim 1, further comprising the step of calculating an I/O operation request frequency reflecting the rate at which the application issues I/O operation requests to the I/O device and based on an average interval between timestamps recorded when the application issues I/O operation requests to an application programming interface.

3. The method of claim 2, further comprising the steps of generating a second shadow request for reserving a second position in the queue for a second future I/O operation request from the application, and inserting the second shadow request into the queue based on the I/O operation request frequency.

4. The method of claim 3, wherein the first shadow request and the second shadow request are separated from each other in the queue by the average interval.

5. The method of claim 1, wherein the step of calculating includes determining an average amount of data being transferred during I/O operations between the application and the I/O device based on information received from an application programming interface.

6. The method of claim 1, wherein the throughput statistics include the available bandwidth of the I/O device.

7. The method of claim 1, wherein the throughput statistics are used to compute average values for the statistical duration over a period of time.

8. The method of claim 1, wherein the I/O device comprises a hard disk, a memory, a computer monitor, or a disc drive.

9. The method of claim 1, wherein the duration is substantially equal to the statistical duration.

10. A computer-readable medium storing instructions that, when executed by a processor, cause a bandwidth manager to issue shadow requests to manage bandwidth allocation between an application that issues input/output (I/O) operation requests and an I/O device, by performing the steps of:
  detecting the completion of an I/O operation that includes either a read operation from the I/O device to the application or a write operation from the application to the I/O device;
  calculating a statistical duration for future I/O operations between the application and the I/O device based on throughput statistics related to past I/O operations between the application and the I/O device;
  generating a first shadow request for reserving a first position in a queue that stores pending I/O requests for the I/O device for a first future I/O operation request from the application and having a duration related to the statistical duration; and
  inserting the first shadow request into the queue.

11. The computer-readable medium of claim 10, further comprising the step of calculating an I/O operation request frequency reflecting the rate at which the application issues I/O operation requests to the I/O device and based on an average interval between timestamps recorded when the application issues I/O operation requests to an application programming interface.

12. The computer-readable medium of claim 11, further comprising the steps of generating a second shadow request for reserving a second position in the queue for a second future I/O operation request from the application, and inserting the second shadow request into the queue based on the I/O operation request frequency.

13. The computer-readable medium of claim 12, wherein the first shadow request and the second shadow request are separated from each other in the queue by the average interval.

14. The computer-readable medium of claim 10, wherein the step of calculating includes determining an average amount of data being transferred during I/O operations between the application and the I/O device based on information received from an application programming interface.

15. The computer-readable medium of claim 10, wherein the throughput statistics include the available bandwidth of the I/O device.

16. The computer-readable medium of claim 10, wherein the throughput statistics are used to compute average values for the statistical duration over a period of time.

17. The computer-readable medium of claim 10, wherein the I/O device comprises a hard disk, a memory, a computer monitor, or a disc drive.

18. The computer-readable medium of claim 10, wherein the duration is substantially equal to the statistical duration.

19. A system for issuing shadow requests to manage bandwidth allocation between an application that issues input/output (I/O) operation requests and an I/O device, the system comprising:
  a memory; and
  a processor configured to:
  detect the completion of an I/O operation that includes either a read operation from the I/O device to the application or a write operation from the application to the I/O device;
  calculate a statistical duration for future I/O operations between the application and the I/O device based on throughput statistics related to past I/O operations between the application and the I/O device;
  generate a first shadow request for reserving a first position in a queue that stores pending I/O requests for the I/O device for a first future I/O operation request from the application and having a duration related to the statistical duration; and
  insert the first shadow request into the queue.

* * * * *